(12) United States Patent
Dutta et al.

(10) Patent No.: US 7,496,831 B2
(45) Date of Patent: Feb. 24, 2009

(54) METHOD TO REFORMAT REGIONS WITH CLUTTERED HYPERLINKS

(75) Inventors: Rabindranath Dutta, Austin, TX (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1693 days.

(21) Appl. No.: 09/791,152

(22) Filed: Feb. 22, 2001

(65) Prior Publication Data
US 2002/0116415 A1 Aug. 22, 2002

(51) Int. Cl.
G06F 15/00 (2006.01)
G06F 17/00 (2006.01)
(52) U.S. Cl. .................. 715/207; 715/204; 715/205; 715/206; 715/208; 715/234; 715/243
(58) Field of Classification Search ............. 340/407.1; 709/203; 707/10, 513; 715/517, 501.1, 204–206, 715/207–208, 234, 243
See application file for complete search history.

(56) References Cited

U.S. PATENT DOCUMENTS

| | | | | |
|---|---|---|---|---|
| 5,424,945 | A | 6/1995 | Bell | 364/419.2 |
| 5,831,617 | A | 11/1998 | Bhukhanwala | 345/349 |
| 6,125,385 | A * | 9/2000 | Wies et al. | 709/203 |
| 6,154,750 | A | 11/2000 | Roberge et al. | 707/104 |
| 6,161,114 | A * | 12/2000 | King et al. | 715/517 |
| 6,161,126 | A * | 12/2000 | Wies et al. | 709/203 |
| 6,226,642 | B1 * | 5/2001 | Beranek et al. | 707/10 |
| 6,459,364 | B2 * | 10/2002 | Gupta | 340/407.1 |

(Continued)

FOREIGN PATENT DOCUMENTS

JP 08-249329 9/1996

(Continued)

OTHER PUBLICATIONS

Walker, Mary, Information Resources for Internet Accessibility, Jul. 31, 1998, School of Information, Communication and Library Studies, Rutgers Univeristy of New Jersey. available at <http://www.scils.rutgers.edu/~mowalker/access08.htm>.*

(Continued)

*Primary Examiner*—William L Bashore
(74) *Attorney, Agent, or Firm*—Duke W. Yee; Jeffrey S. LaBaw; Gerald H. Glanzman (57) ABSTRACT

A method for presenting a page, having a set of links, on a data processing system is provided. The page is preprocessed to form a processed page, wherein the processed page is unpresented within the data processing system. A determination is made as to whether or not the links within the page fall within a proximity policy. Responsive to a determination that the page falls outside of the proximity policy, the page is reformatted to fall within the proximity policy. The mechanism of the present invention includes a preprocessing process and a policy structure for reformatting an electronic document page. The policy structure of the present invention allows the user to specify the appearance of the electronic document page. The policy structure as defined by the user is stored such that when the user returns to the page, the page may be displayed according to the policy structure defined by the user.

16 Claims, 6 Drawing Sheets

U.S. PATENT DOCUMENTS

| | | | |
|---|---|---|---|
| 6,535,896 B2 | 3/2003 | Britton et al. | |
| 6,556,217 B1* | 4/2003 | Makipaa et al. | 345/667 |
| 6,657,647 B1* | 12/2003 | Bright | 715/856 |
| 6,874,122 B1* | 3/2005 | Bates et al. | 715/236 |
| 2002/0065658 A1* | 5/2002 | Kanevsky et al. | 704/260 |
| 2003/0217117 A1* | 11/2003 | Dan et al. | 709/218 |

FOREIGN PATENT DOCUMENTS

| | | |
|---|---|---|
| JP | 09091187 | 4/1997 |
| JP | 09009160 | 10/1997 |
| KR | 2000-53638 | 8/2000 |
| KR | 2000-68185 | 2/2001 |
| KR | 2001-8236 | 2/2001 |

OTHER PUBLICATIONS

Starling Access Services, Accessible Web Page Design: Using the <Font> tag. Jul. 1997). available at <http://www.starlingweb.com/acc/acfon.htm>.*

Quin, Liam, Accessiblity Tips, Web Design Group, copyright 1997-2002. available at <http://htmlhelp.com/design/accessibility/tips.html>.*

Lie, Hakon Wium, Cascading Style Sheets, level 1, W3C Recommendation Dec. 17, 1996, revised Jan. 11, 1999. available at <http://www.w3.org/TR/REC-CSS1>.*

Greg J. Badros, Constraint cascading style sheets or the Web, 1999, ACM Press, pp. 73-82.*

Branwyn, Gareth, Mosaic Quick Tour For MAC: Accessing & Navigating the Internet's World Wide Web, Ventura Press, 1994, pp. 1-2, 52-59.*

NCSA Mosaic 2.01 for the MAC, 1995, screenshots from working program, pp. 1-3.*

Vanderheiden et al., Central Reference Document—Version 8 Unified Web Site Accessibility Guidelines, Jan. 20, 1998, downloaded from <http://trace.wisc.edu/archive/html_guidelines/central.htm> on Jan. 27, 2008, pp. 1-40.*

Microsoft Corporation, "Chapter 10: Accessibility Features and Functionality", Internet Explorer 5 Resource Kit, http://www.microsoft.com/resources/documentation/Windows/2000/server/reskit/en-us/ierk/Ch10_a.asp, Feb. 2000, pp. 1-10.

Bos et al., "Cascading Style Sheets, level 2, CSS2 Specification", http://www.w3.org/TR/REC-CSS2/css2.pdf, May 1998, pp. 1-3, 63, 64, 141-144, 237-244, 317-324.

Chisholm, "Web Content Accessibility Guidelines 1.0", http://www.w3.org/TR/1999/WAI-WEBCONTENT-19990505/wai-pageauth.ps, May 1999, pp. 1-34.

Chisholm, "Techniques for Web Content Accessibility Guidelines", http://www.w3.org/TR/1999/WD-WAI-PAGEAUTH-19990226/wai-pageauth-tech.ps, Feb. 1999, pp. 1-3, 36-38.

Miwa et al., "LP Map Distortion Method", NTT Multimedia Networks Laboratories, Toyohasi University of Technology, 1996, pp. 1-8. (english abstract provided).

* cited by examiner

METHOD TO REFORMAT REGIONS WITH CLUTTERED HYPERLINKS

BACKGROUND OF THE INVENTION

1. Technical Field

The present invention relates to an improved data processing system. More particularly, the present invention provides a method and system for uncluttering and reformatting a web page before presenting the web page to a user.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a uniform resource identifier (URI), such as, for example, a URL at the client machine. Retrieval of information on the Web is generally accomplished with an HTML-compatible browser. Examples of browsers include Netscape Navigator, which is available from Netscape Communications Corporation, and Internet Explorer, which is available from Microsoft Corporation.

Pages retrieved from a Web server often contain many links that may be of interest to a user. The amount of information and links available in response to a user query is often overwhelming. In addition to links related to the user query, other links of interest may be encountered that a user may want to visit. Presently, a user is unable to identify and manage links on a browser. Currently, a user must store links in a bookmarking mechanism although the links may not be valuable enough for this type of permanent storage. As a result, the user must go back and remove links from the set of bookmarks after visiting a page. This mechanism is time consuming and cumbersome.

However, HTML can be frustrating when controlling the appearance of a Web page. In response, for the appearance of Web pages, a complementary markup system called Cascading Style Sheets (CSS) were designed to make it easier to define a web page's appearance without affecting the web page's HTML structure. Style sheets work like templates, a style is defined for a particular HTML element and then this defined style is used over and over on any number of web pages. If there is a desire to change how an HTML element looks, the style is changed, the HTML element automatically changes wherever the HTML element appears. Style sheets allow web designers quickly create more consistent web pages and more consistent web sites.

Business needs dictate that an increasing amount of information and hyperlinks are presented on a single web page. This gives the information and hyperlinks high visibility. When a vast array of hyperlinks are packed into a small area on a single web page, it usually results in a cluttered arrangement. As a consequence of this clutter, users who may have some difficulty with sensory motor skills may have difficulty in accessing a particular hyperlink or accessing the desired information. As a result, some users may attempt to "point and click" to a blank space on the web page or may access the wrong hyperlink. Prior art solutions to these problems have provided users with navigation of the web page using a keyboard and using tab keys. However, this technique is time consuming and may require many key strokes. Other prior art solutions include installing magnifying software applications to magnify a portion of the web page the user wishes to concentrate on. This technique is deficient in that it is also time consuming and requires additional key strokes.

In addition, under Federal government standards, the Federal government will be in the forefront in ensuring access to electronic and information technology. These standards cover various means of disseminating information, including computers, software and electronic office equipment. The standards provide criteria that spell out what is required to make informational products accessible to people and in particular accessible to people with disabilities, including, but not limited to, those with vision, hearing and mobility impairments.

The new standards provide technical criteria specific to various types of technologies and performance based requirements, which focus on the functional capabilities of covered technologies. Specific criteria cover, for example, software applications, operating systems, web-based information, web-based applications, telecommunication functions, video or multi-media products, self contained closed products such as information kiosks and transactions machines and computers. Also covered is the compatibility with adaptive equipment users with disabilities use for information and communication access. However, the Federal government is not alone in taking action on this front. Private industry and research entities are demonstrating initiative in improving access for people with disabilities in the Digital Age.

Therefore, it would be advantageous to have a method and apparatus for indicating and managing web page information and hyperlinks during a search or session.

SUMMARY OF THE INVENTION

The present invention provides a method for presenting a page, having a set of links, on a data processing system. The page is preprocessed to form a processed page, wherein the processed page is unpresented within the data processing system. A determination is made as to whether or not the links within the page fall within a proximity policy. Responsive to a determination that the page falls outside of the proximity policy, the page is reformatted to fall within the proximity policy.

The mechanism of the present invention includes a preprocessing process and a policy structure for reformatting an electronic document page. The policy structure of the present invention allows the user to specify the appearance of the electronic document page. The policy structure as defined by the user is stored such that when the user returns to the page, the page may be displayed according to the policy structure defined by the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
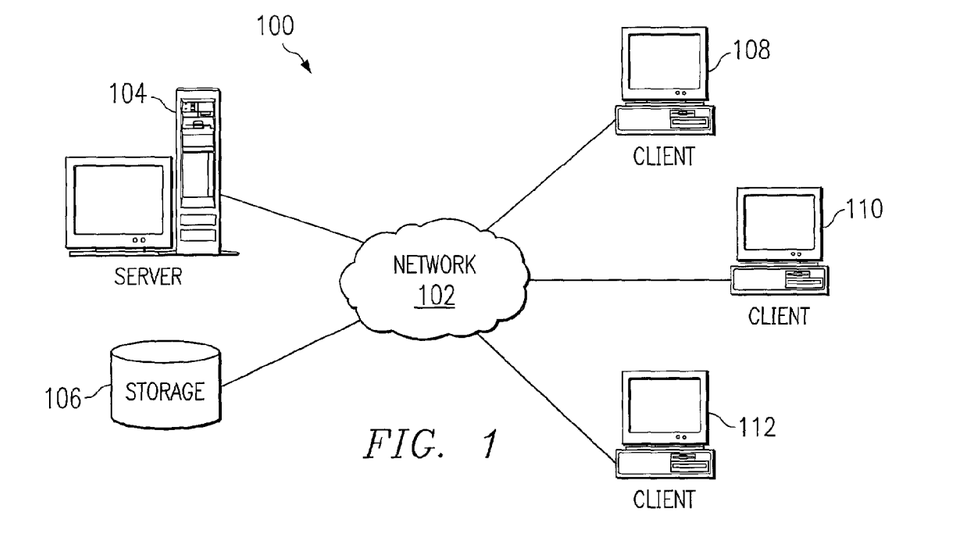
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
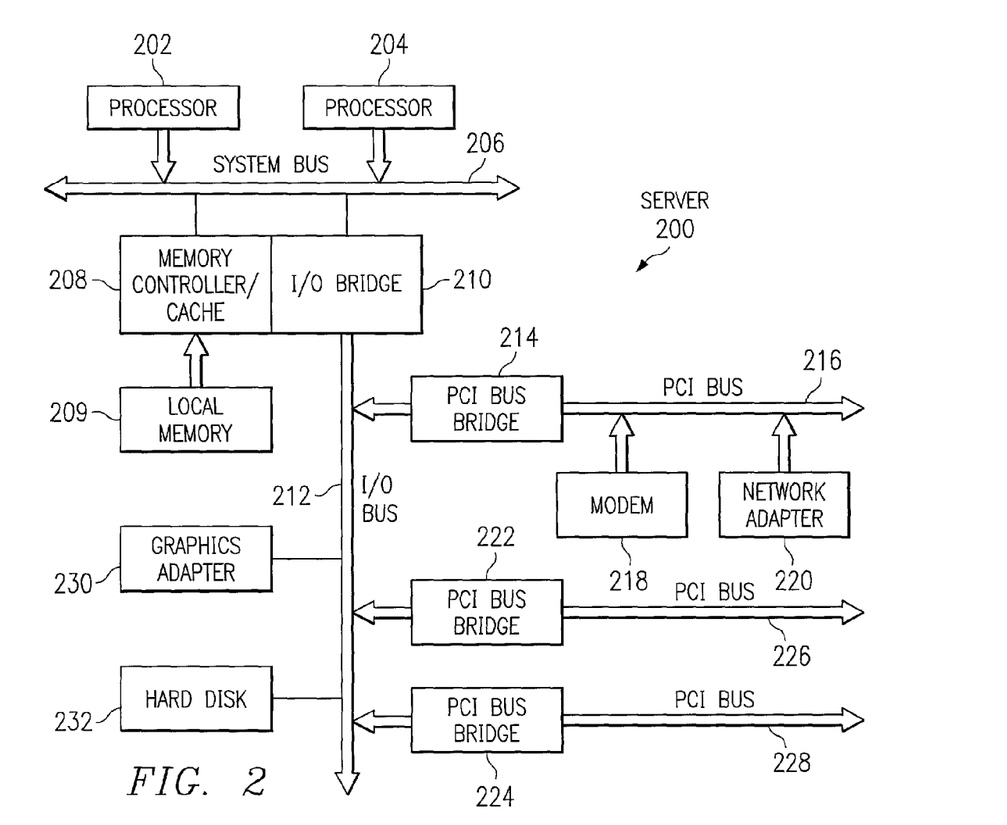
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
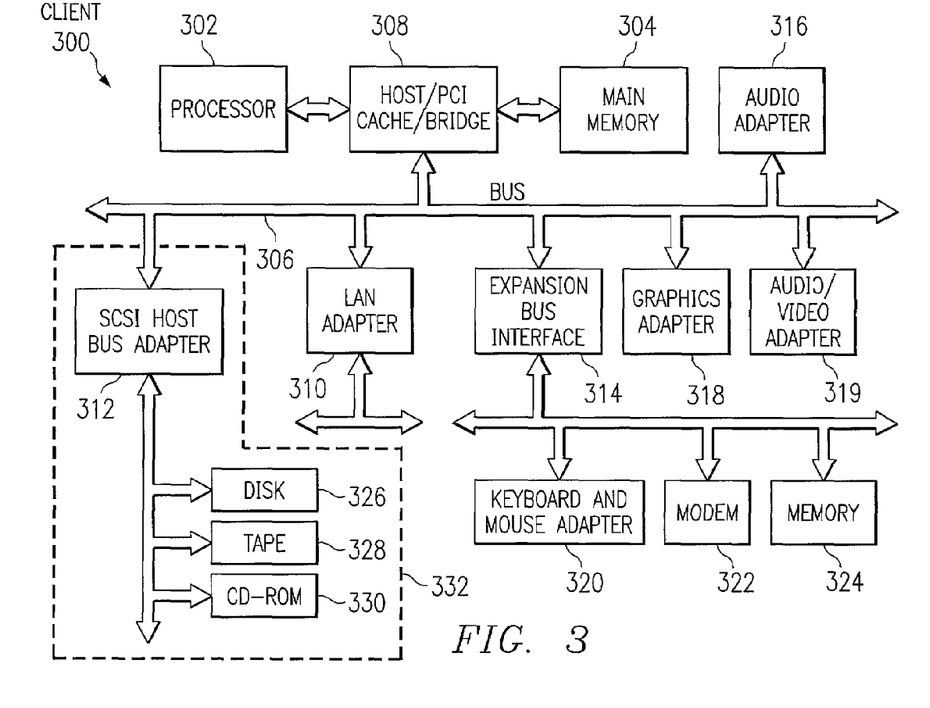
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method for uncluttering an electronic document so that a user may easier read the electronic document. The mechanism of the present invention includes a preprocessing process and a policy structure for reformatting an electronic document page. The policy structure of the present invention allows the user to specify the appearance of the electronic document page. The policy structure as defined by the user is stored such that when the user returns to the page, the page may be displayed according to the policy structure defined by the user.

Figure 4:
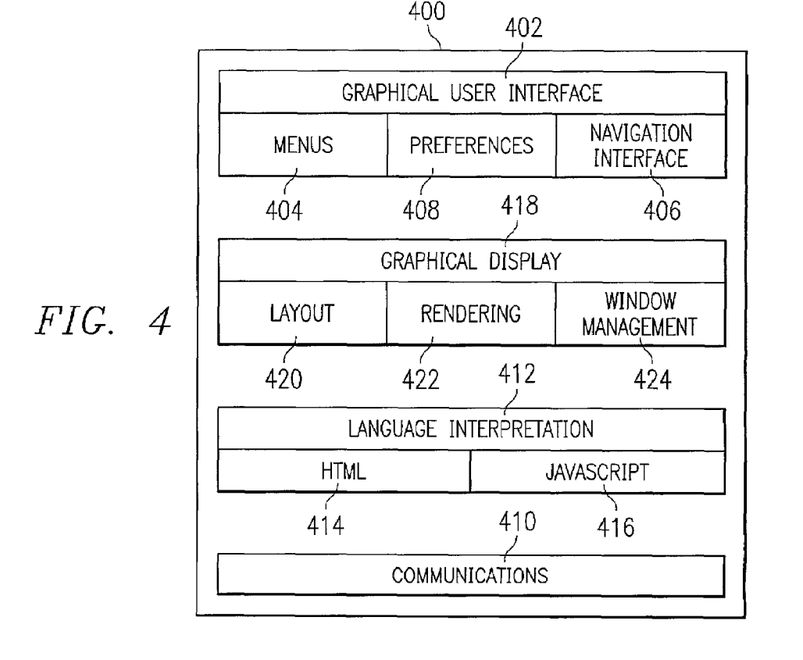
FIG. 4 is a block diagram of a browser program depicted in accordance with a preferred embodiment of the present invention.

Turning next to FIG. 4, a block diagram of a browser program is depicted in accordance with a preferred embodiment of the present invention. A browser is an application used to navigate or view information or data in a distributed database, such as the Internet or the World Wide Web.

In this example, browser 400 includes a user interface 402, which is a graphical user interface (GUI) that allows the user to interface or communicate with browser 400. This interface provides for selection of various functions through menus 404 and allows for navigation through navigation interface 406. For example, menus 404 may allow a user to perform various functions, such as saving a file, opening a new window, displaying a history, and entering a URL. Navigation interface 406 allows for a user to navigate various pages and to select web sites for viewing. For example, navigation interface 406 may allow a user to see a previous page or a subsequent page relative to the present page. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP as well as other standard communication protocols. Other protocols may be used depending on the implementation. Documents that are received by browser 400 are processed by language interpretation 412, which includes an HTML unit 414 and a JavaScript unit 416. Language interpretation 412 will process a document for presentation on graphical display 418. Graphical display 418 includes layout unit 420, rendering unit 422, and window management 424. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 make be implemented using known browser applications, such as Netscape Navigator or Microsoft Internet Explorer. Netscape Navigator is available from Netscape Communications Corporation while Microsoft Internet Explorer is available from Microsoft Corporation.

Figure 5A:
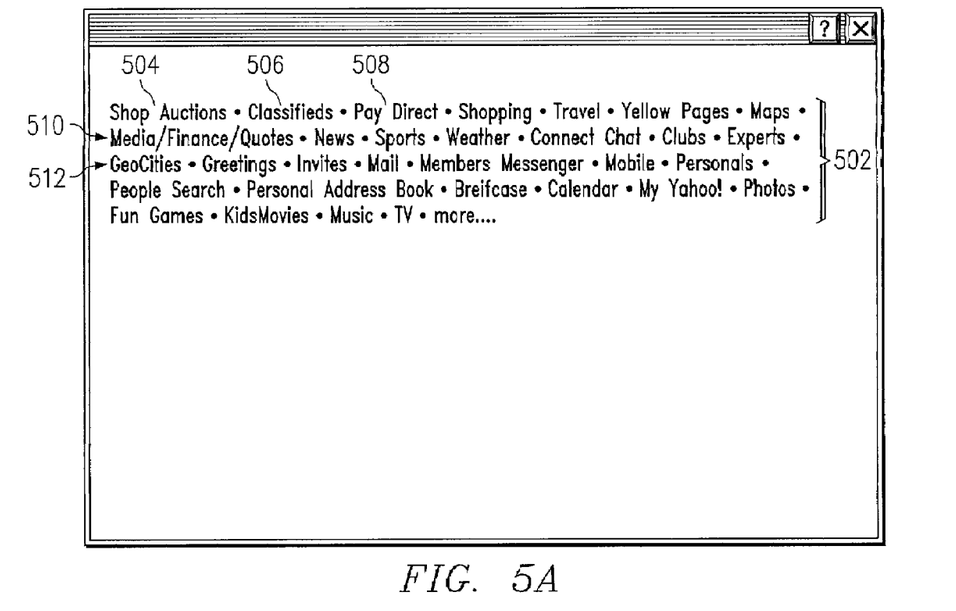
FIGS. 5A and 5B are exemplary graphical user interfaces illustrating a web page containing multiple hyperlinks in accordance with a preferred embodiment of the present invention.
Figure 5B:
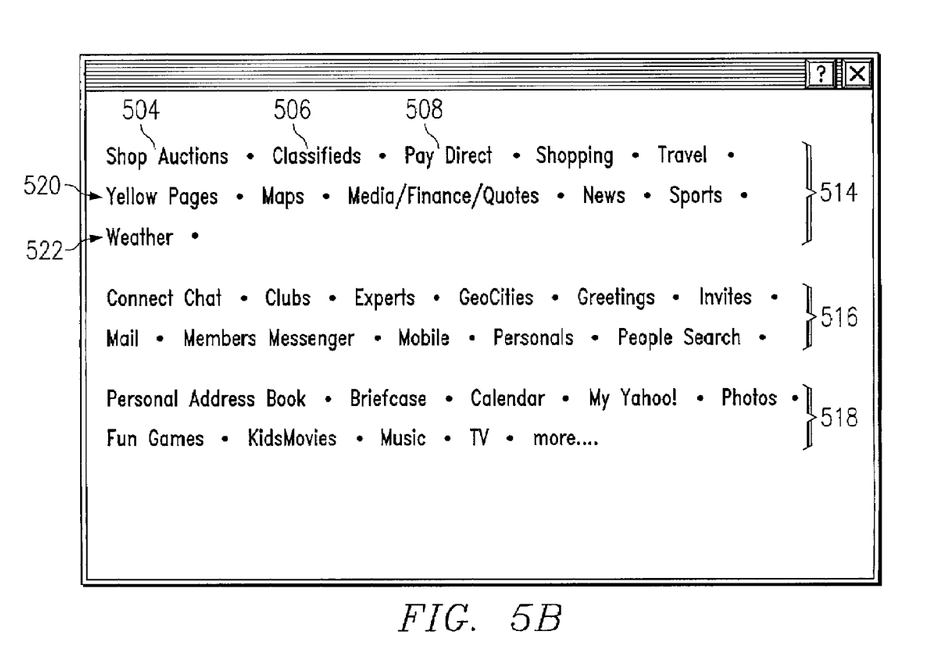

FIGS. 5A and 5B are exemplary graphical user interfaces illustrating uncluttering a web page containing multiple hyperlinks in accordance with a preferred embodiment of the present invention. FIG. 5A is an example of a cluttered web page. In FIG. 5A, hyperlink group 502 is arranged so that "Shop Actions" 504, "Classifieds" 506 and "Pay Direct" 508 have a limited amount of spacing between them. In addition, line 510 beginning with "Media/Finance/Quotes" and line 512 beginning with "GeoCities" also have a limited amount of spacing between them. This cluttered limited spacing format may be difficult for a person with a visual or mobile disability to pick and choose a hyperlink. The present invention expands the appearance of a web page. The appearance of a web page to a user may be based on user defined parameters.

FIG. 5B is an example of an uncluttered web page. In FIG. 5B, hyperlink group 502 in FIG. 5A has been split into hyperlink groups 514, 516 and 518. In addition, the hyperlinks within each of hyperlink groups 514, 516 and 518 has been expanded to allow for greater spacing between the hyperlinks and easier access for a person who may have visual or mobility impairments. For example, within hyperlink group 514, "Shop Auctions" 504, "Classifieds" 506 and "Pay Direct" 508 have greater spacing between each other as well as greater spacing from the rest of the hyperlinks in hyperlink group 514. Additionally, line 520 beginning with "Yellow Pages" and line 522 beginning with "Weather" have greater spacing between each other.

Figure 6:
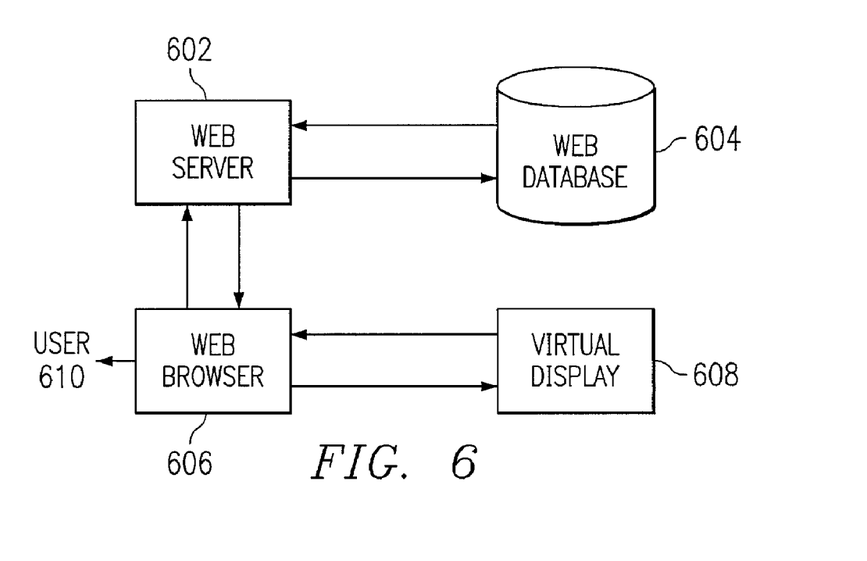
FIG. 6 is a block diagram of automatically uncluttering and reformatting an electronic document in accordance with a preferred embodiment of the present invention.

FIG. 6 is a block diagram of automatically uncluttering and reformatting an electronic document in accordance with a preferred embodiment of the present invention. Cluttered hyperlinks within a region on a page of an electronic document may be automatically uncluttered by preprocessing the page of the page of the electronic document and reformatting it if necessary before presenting the electronic document page to a user. This may enable the user to select hyperlinks that appear on the electronic document page with greater ease. Also, this process may be used in conjunction with other accessibility software, such as, for example, magnification software, which is targeted for users with disabilities, such as, for example, vision impairment.

In this example, web browser 606 sends a request to web server 602 for an electronic document. Web server 602, in turn, contacts web database 604 to determine whether or not the requested electronic document exists. If the electronic document does exists in web database 604, server 602 may either send, for example, a preformatted electronic document, such as, for example, a hypertext markup language (HTML) document or web page, or combines, for example, web page content plus web server 602 specific cascading style sheet and generates a formatted web page. Based on user 610 preferences, on web browser 606, the server projects the web page content on virtual display 608. Projecting web page content on virtual display 608 may be internal to web browser 606 and not visible to user 610. Web browser 606 may determine that hyperlinks displayed on a page of the electronic document are cluttered based on several criteria. Such criteria may be, for example, the number of hyperlinks per unit of measure, vertical spacing between hyperlinks and/or horizontal spacing between hyperlinks displayed on the page of the electronic document.

The present invention uses a proximity policy to reformat regions of a web page which has cluttered hyperlinks. Web browser 606 may use several methods to determine if a web page fails to meet the proximity policy which may be set by a user. For example, a user may determine that vertical and horizontal spacing between any two or more hyperlinks is, for example, at least 15 pixels. The user may then set web browser 606 preferences accordingly. Alternatively, the proximity policy may define that the vertical and horizontal spacing between two or more hyperlinks may be, for example, 10 points. Another scale that may be used to ensure that two or more hyperlinks are not unreasonably close to each other may be by drawing geometrical shapes, for example, a rectangle or ellipse, around each hyperlink and thereby ensuring that the two geometric shapes do not overlap.

As a further example, a first hyperlink and a second hyperlink do not satisfy the proximity policy because a defined area around the first hyperlink and a defined area around the second hyperlink overlap. Therefore, the spacing between the first hyperlink and the second hyperlink may be required to be increased. The size of a rectangle that may be drawn around the first hyperlink may increased, for example, by 10 pixels plus the height of the first hyperlink for the width of the rectangle and 10 pixels plus the length of the first hyperlink for the length of the rectangle. This method ensures the first hyperlink is spaced far enough from the second hyperlink to aid a user in clearly viewing the two hyperlinks. The second hyperlink cannot encroach upon the area within the rectangle drawn around and dedicated to the first hyperlink.

Web browser 606 may already have information on, for example, the hyperlink display area, current font setting and the like. Web browser 606 may then reformat those regions of the electronic document page which are cluttered. Web browser 606 may use, for example, HTML tags, such as, for example <P> denoting paragraph and the like, to reduce the clutter of the electronic document page. In addition, HTML tag elements <PRE> and </PRE> may be used to introduce a spade between words. Any space inserted into the text between tag elements in this example, <PRE> and </PRE> may be preserved by web browser 606. Similarly, tag element <BR> may be used to introduce line breaks within the electronic document page to render hyperlinks on a different line. When this process is complete, the user may then view an electronic document page which is free from clutter and is easier to read.

A sample HTML file for uncluttering a web page, may be, for example:

<HTML>
<HEAD>
<TITLE>Web page that has cluttered hyperlinks</TITLE>
<LINK TITLE="new" REL=stylesheet
HREF="file://d:\unclutter.css "TYPE="text/css">
<\HEAD>
<BODY>
<H1>Headline is blue<\H1>
<P STYLE="color:green">While paragraph is green.
<\BODY>
<\HTML>

FIG. 5 illustrates the situation in which a page is cluttered with hyperlinks, however, the user may desire to configure an electronic document page to suit his or her own needs. This process is illustrated in FIG. 7.

Figure 7:
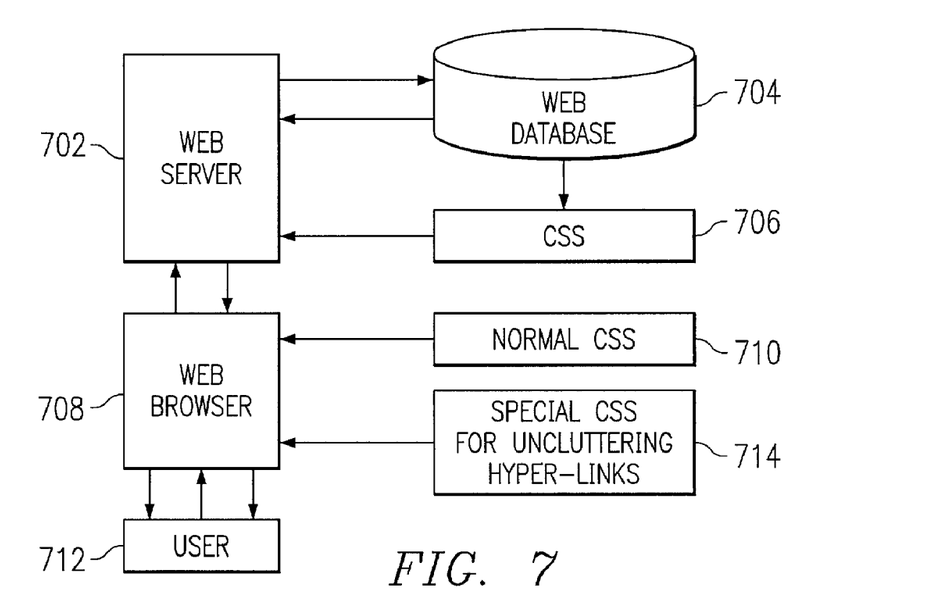
FIG. 7 is a block diagram of uncluttering an electronic document by a browser using a cascading style sheet in accordance with a preferred embodiment of the present invention.

FIG. 7 is a block diagram of uncluttering an electronic document by a browser using a cascading style sheet in accordance with a preferred embodiment of the present invention. Cluttered hyperlinks appearing upon a page of an electronic document may be uncluttered by a browser using, for example, a special cascading style sheet. By using a special cascading style sheet, the user may select the hyperlinks more efficiently which may also aid other accessibility software.

As explained above, a cascading style sheet is designed to make it easier to define a web page's appearance without affecting the web page's HTML structure. Style sheets work like templates, a style is defined for a particular HTML element and then this defined style is used over and over on any number of web pages. A cascading style sheet specification may include, for example, "word-spacing" and "line-height."

"Word-spacing" specifies the spacing between words. This spacing between words may consist of a "normal" value which may be defined by the current font or be a default value. In addition, a "length" value may also be defined for the spacing between words. The length value may indicate the inter-word space in addition to that defined by the current font or the default value.

"Line-height" specifies a minimal height of a generated inline box if a property is set on a block-level element whose content is composed of inline level elements. The height of an generated inline box may be different from the font size of text in the box and, therefore, there may be a space above and below rendered glyphs. The difference between the font size and a computed value of "line height" is called the leading. Half the leading is called the half-leading.

A glyph may be centered vertically in an inline box, adding a half-leading on the top of the inline box and on the bottom of the inline box. For example, if part of a text is 12 points high and the line height is 14 points high, 2 points of extra space may be added: 1 point above the text and 1 point below the text. When the line-height value is less than the font size, a final inline box height is less than the font size and rendered glyphs will "bleed" outside of the inline box. If such a box touches the edge of a line box, the rendered glyphs may also bleed into the adjacent line box. Although margins, borders, and padding of non-replaced elements may not enter into inline box height calculations, margins, borders and padding of non-replaced elements may still be rendered around inline boxes. In other words, this means that if the height of a line box is shorter than the outer edges of the boxes it contains, backgrounds and colors of padding and borders may bleed into adjacent line boxes.

A custom style sheet that unclutters a web page by using word-spacing and line-height elements of a cascading style sheet may be, as follows:

BODY {background: white; color: brown}
H1 {font: 18 pt Arial bold}
P {font: 12 pt Arial; text-indent: 0.5 in}
P.initial:first letter {font-size: 200%; float: left}
A:link {color: red; word-spacing:2.0 em; line-height: 1.2; font-size: 10 pt} /* unvisited links */
A:visited {color: blue; word-spacing: 2.4 em; line-height: 1.2; font-size: 10 pt} /* visited links */
A:active {color:yellow; word-spacing: 2.4 em; line-height: 1.2; font-size 10 pt} /* active links */

In this example, web browser 708 contacts web server 702 and transmits a request for an electronic document. Web server 702 then contacts web database 704 to determine whether the requested electronic document exists. If the requested electronic document does exist within web database 704, then web database 704 provides, for example, a HTML web page with HTML tags or combines web page content within web database 704 and server specific cascading style sheet 706 and sends a web page with HTML tags. Web server then may present a formatted content electronic document page to web browser 708 in which web browser 708 may use cascading style sheet 710 on a client side. The electronic document may then be displayed to user 712. If user 712 determines that a region on the page of the electronic document is cluttered, then user 712 may request that web browser 708 reformat the page. During the reformatting of the electronic document page, web browser 708 may use special cascading style sheet 714 as defined by user 712. After reformatting of the page of the electronic document, the page of the electronic document is displayed to user 712 for viewing. Furthermore, alternative embodiments which utilize a document object model (DOM) may also be constructed.

Figure 8:
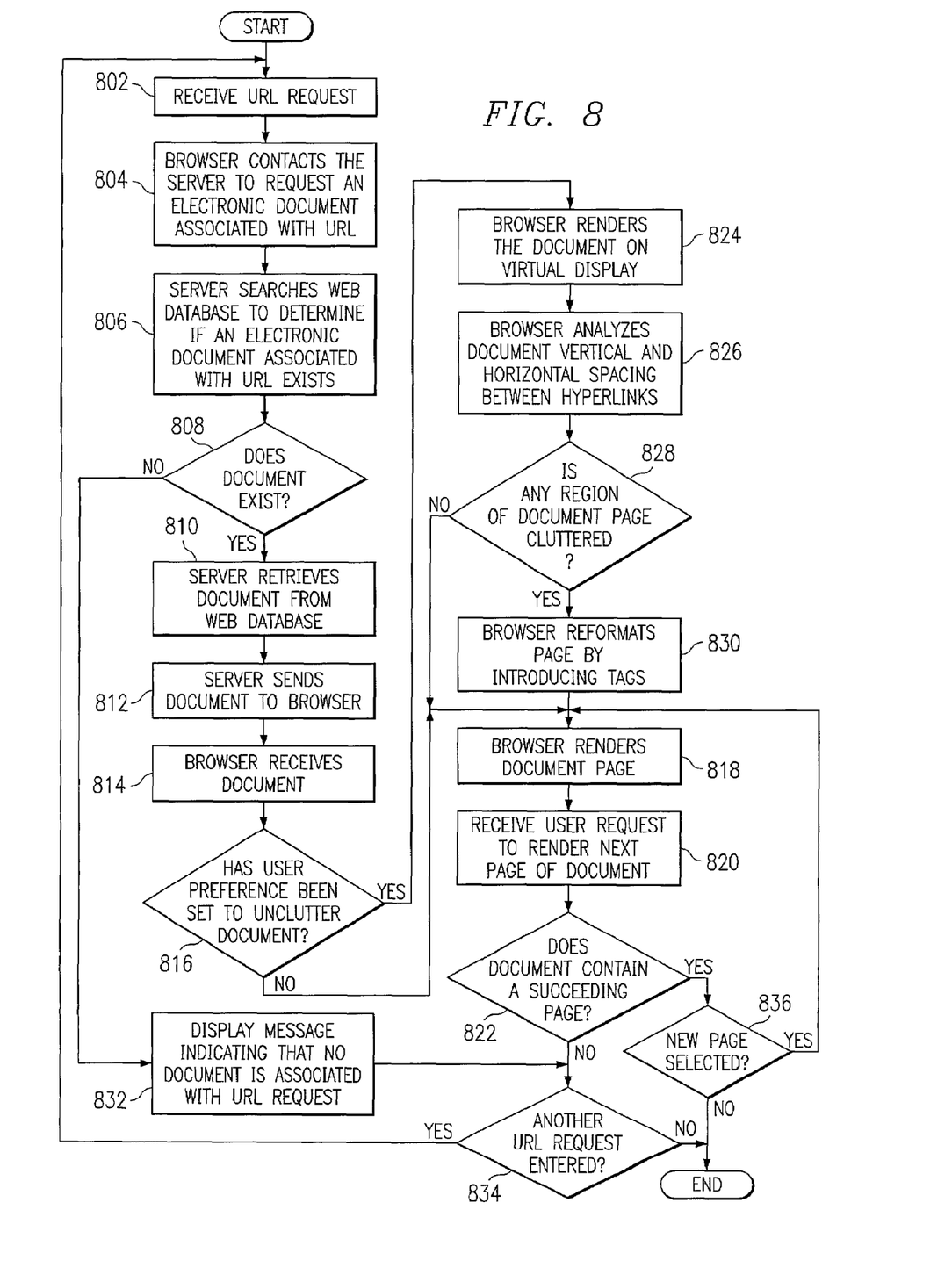
FIG. 8 is a flowchart illustrating information flow for automatically uncluttering a hypertext markup language document in accordance with a preferred embodiment of the present invention.

FIG. 8 is a flowchart illustrating information flow for automatically uncluttering a hypertext markup language document in accordance with a preferred embodiment of the present invention. FIG. 8 further illustrates the process outlined in FIG. 6. In this example, the operation starts by a web browser receiving a universal resource locator (URL) request to access an electronic document (step 802). The web browser then contacts the web server to request an electronic document associated with the URL (step 804). The web server then searches a web database to determine if an electronic document associated with the URL exists (step 806). If an electronic document associated with the URL does not exist in the web database (step 808:NO), a message is displayed indicating that no document exists that is associated with the requested URL (step 832). Then a determination is made as to whether or not another URL is entered (step 834). If another URL is not entered (step 834:NO), the operation terminates. If another URL is entered (step 834:YES), the operation returns to step 802 in which the URL requested is received.

Returning to step 808, if a document does exist in web database associated with the requested URL (step 808:YES), the server retrieves the document from the web database (step 810). The server then sends the document to the web browser (step 812) and the web browser receives the document (step 814). Then a determination is made as to whether or not a user preference has been set to unclutter the received electronic document (step 816). If a user preference has not been set to unclutter the received electronic document (step 816:NO), the web browser renders the document page (step 818). A request to render the next page of the document is received (step 820). Then a determination is made as to whether or not the document contains a succeeding page (step 822). If the document does not contain a succeeding page (step 822:NO), a determination is made as to whether or not another URL is requested (step 834). If the document does contain a succeeding page (step 822:YES), a determination is made as to whether or not a new page is selected (step 836). If an new page has not been selected (step 836:NO), the operation terminates. If a new page is selected (step 836:YES), the operation returns to step 818 in which the web browser renders the document page.

Returning to step 816, if a user preference has been set to unclutter the document (step 816:YES), the web browser renders the document on a virtual display (step 824). Then the web browser analyses the document vertical and horizontal spacing between hyperlinks (step 826). Then a determination is made as to whether or not any region of the document page is cluttered (step 828). If no region of the document page is cluttered (step 828:NO), the web browser renders the document page (step 818). If any region of the document page is cluttered (step 828:YES), the web browser reformats the document page by introducing tags (step 830) and thereafter the browser renders the document page (step 818).

Figure 9:
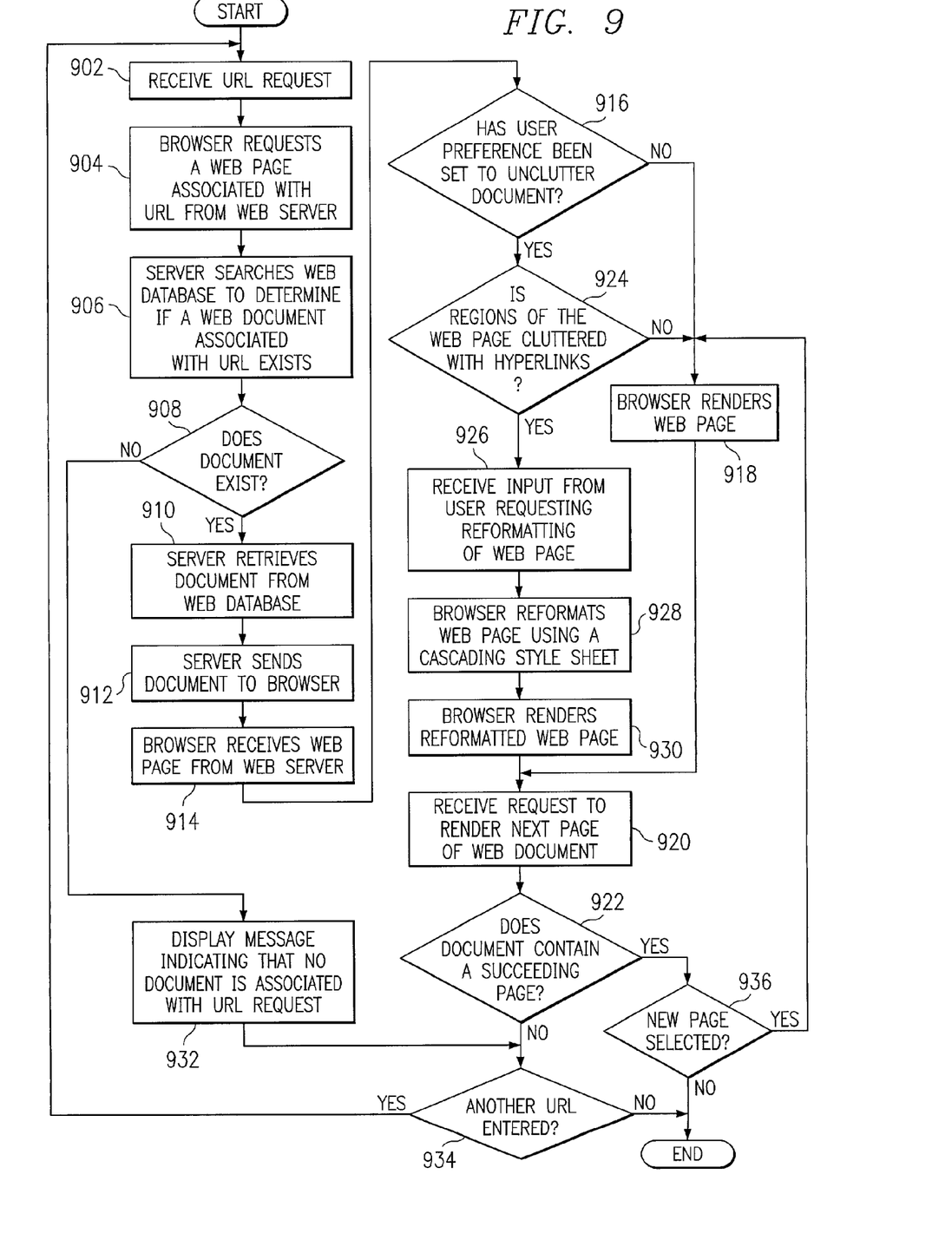
FIG. 9 is a flowchart illustrating uncluttering a web page using a cascading style sheet in accordance with a preferred embodiment of the present invention.

FIG. 9 is a flowchart illustrating uncluttering a web page using a cascading style sheet in accordance with a preferred embodiment of the present invention. FIG. 9 further illustrates the process outlined in FIG. 7. In this example, the operation begins by receiving a URL request (step 902). The web browser then requests a web page associated with the URL from a web server (step 904). The web server then searches a web database to determine if a web document associated with the URL exists (step 906). Then a determination is made as to whether or not a web document associated with the URL exists (step 908). If a web document associated with the URL does not exist (step 908:NO), then a message is displayed indicating that no document is associated with the URL request (step 932). Then a determination is made as to whether or not another URL has been entered (step 934). If another URL has not been entered (step 934:NO), the operation terminates. If another URL has been entered (step 934:YES), the operation returns to step 902 in which the URL is received.

Returning to step 908, if a document does exist that is associated with the URL request (step 908:YES), the server retrieves the document from the web database (step 910). The web server then sends the document to the web browser (step 912). The web browser receives the web page from the web server (step 914). Then a determination is made as to whether or not user preferences has been set to unclutter the web document (step 916). If user preferences have not been set to unclutter the web document (step 916:NO), the web browser renders the web page (step 918). A request is received to render the next page of the web document (step 920). Then a determination is made as to whether or not the document contains a succeeding web page (step 922). If the web document does not contain a succeeding page (step 922:NO), then a determination is made as to whether or not another URL is entered (step 934). If the web document does contain a succeeding page (step 922:YES), a determination is made as to whether or not a new page is selected (step 936). If a new page is not selected (step 936:NO), the operation terminates. If a new page is selected (step 936:YES), then the operation returns to step 918 in which the web page is rendered.

Returning to step 916, if user preferences have been set to unclutter the document (step 916:YES), then a determination is made as to whether or not regions of the web page are cluttered with hyperlinks (step 920). If regions of the web page are not cluttered with hyperlinks (step 920:NO), then the browser renders the web page (step 918). If regions of the web page are cluttered with hyperlinks (step 920:YES), input is received from a user requesting reformatting of the web page (step 926). The browser then reformats the web page using a cascading style sheet (step 928). The browser then renders the reformatted web page (step 930). Then a request is received to render the next page of the web document (step 920).

Therefore, the present invention a method and apparatus for indicating and managing web page information and hyperlinks during a search or session. The mechanism of the present invention includes a preprocessing process and a policy structure for reformatting an electronic document page. The policy structure of the present invention allows the user to specify the appearance of the electronic document page. The policy structure as defined by the user is stored such that when the user returns to the page, the page may be displayed according to the policy structure defined by the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the present invention may use Document Object Model (DOM) or Extensible Style Sheet Language (XSL) to modify the appearance of a web page. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a computer system for presenting a page, the method comprising:
   receiving a page;
   rendering the received page on a virtual display to form a rendered page;
   determining whether the rendered page falls within a proximity policy;
   responsive to determining that the rendered page does not fall within the proximity policy, reformatting the rendered page on the virtual display to fall within the proximity policy to form a reformatted page, wherein the proximity policy defines a minimal spacing between links of a plurality of links within the page; and
   presenting the reformatted page to a user.

2. The computer implemented method of claim 1, wherein reformatting the rendered page to fall within the proximity policy includes at least one of a hypertext markup language (HTML) tag and a cascading style sheet.

3. The computer implemented method of claim 1, wherein the proximity policy includes at least one of a number of links, a spacing of links within the plurality of links, a font setting for the plurality of links, and a number of links per unit area.

4. The computer implemented method of claim 1, wherein reformatting the rendered page to fall within the proximity policy includes using at least one tag element for reformatting the rendered page.

5. The computer implemented method of claim 1, wherein the page is a markup language document.

6. The computer implemented method of claim 5, wherein the markup language document is one of a hypertext markup language document and an extensible markup language document.

7. The computer implemented method of claim 1, wherein the page comprises web page content and cascading style sheet information.

8. The computer implemented method of claim 1, wherein the proximity policy includes a set of rules to increase accessibility of the page to visually impaired users.

9. The computer implemented method of claim 1, and further comprising:
   responsive to determining that the rendered page falls within the proximity policy, presenting the page to the user without reformatting the rendered page.

10. The computer implemented method of claim 1, and further comprising:
    receiving a user input enabling reformat the received page.

11. The computer implemented method of claim 1, further comprising:
    modifying the proximity policy according to a user preference.

12. A computer implemented method in a computer system for presenting a page including a set of links, the method comprising:

receiving the page and set of links;

determining whether reformatting of the received page is enabled;

responsive to determining that reformatting of the received page is enabled, rendering the received page and set of links on a virtual display to form a rendered page and set of links;

determining whether the rendered page and set of links falls within a proximity policy;

responsive to determining that the rendered page and set of links does not fall within the proximity policy, reformatting the rendered page and set of links using the proximity policy to form a reformatted page on the virtual display, wherein the proximity policy defines a minimal spacing between links of the set of links within the page; and     presenting the reformatted page and set of links to the user.

13. The computer implemented method of claim 12, wherein reformatting the rendered page and set of links using the proximity policy to form a reformatted page on the virtual display includes at least one of a hypertext markup language (HTML) tag and a cascading style sheet.

14. The computer implemented method of claim 12, wherein the proximity policy includes at least one of a spacing for the set of links, a font for the set of links, a color for the set of links, a font size for the set of links, and a number of links per unit area.

15. The computer implemented method of claim 12, wherein the page is a web page.

16. The computer implemented method of claim 12, and further comprising:

responsive to determining that the rendered page and set of links falls within the proximity policy, presenting the page and set of links to the user without reformatting the rendered page.

* * * * *